(12) United States Patent
Boddenberg et al.

(10) Patent No.: US 10,889,219 B2
(45) Date of Patent: Jan. 12, 2021

(54) ARMREST ARRANGEMENT FOR A MOTOR VEHICLE SEAT

(71) Applicants:Jan Boddenberg, Cologne (DE); Hartmut Bohlke, Wuppertal (DE); Andreas Göbbels, Kürten (DE); Tanja Pink, Wuppertal (DE); Wolfgang Sitzler, Wuppertal (DE); Bogdan Tutelea, Leichlingen (DE)

(72) Inventors: Jan Boddenberg, Cologne (DE); Hartmut Bohlke, Wuppertal (DE); Andreas Göbbels, Kürten (DE); Tanja Pink, Wuppertal (DE); Wolfgang Sitzler, Wuppertal (DE); Bogdan Tutelea, Leichlingen (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 16/446,797

(22) Filed: Jun. 20, 2019

(65) Prior Publication Data

US 2019/0389351 A1  Dec. 26, 2019

(30) Foreign Application Priority Data

Jun. 25, 2018  (DE) .......................... 10 2018 210 338

(51) Int. Cl.
*B60N 2/75* (2018.01)
*B60N 2/90* (2018.01)

(52) U.S. Cl.
CPC ............. *B60N 2/767* (2018.02); *B60N 2/938* (2018.02)

(58) Field of Classification Search
CPC ................................ B60N 2/767; B60N 2/938
See application file for complete search history.

(56) References Cited

U.S. PATENT DOCUMENTS 5,984,416 A * 11/1999 Waldo .................... A47C 1/03
297/411.38
7,845,732 B2 * 12/2010 Liu ......................... B60N 2/767
297/411.38

(Continued)

FOREIGN PATENT DOCUMENTS

DE       102016220501 A1    8/2017

*Primary Examiner* — Philip F Gabler
(74) *Attorney, Agent, or Firm* — Flynn Thiel, P.C.

(57) ABSTRACT

Armrest arrangement for a motor vehicle seat having a positionally fixed carrier structure, an armrest structure shiftable about a pivot axis an inclination adjustment device for the armrest structure and which has an adjustment element supported on the carrier structure, a drive device operatively connected to the adjustment element and a blocking device, operatively connected to the adjustment element. In a release state of the inclination adjustment device, the drive device brings about a driven adjustment movement of the adjustment element along an adjustment axis relative to the armrest structure, and in a blocking state of the inclination adjustment device, the blocking device brings about blocking of the adjustment element along the adjustment axis. In the blocking state, the drive device is operatively connected to the blocking device in a force-and/or torque-transmitting manner such that the drive device reinforces a blocking action of the blocking device.

19 Claims, 6 Drawing Sheets

(56) References Cited

U.S. PATENT DOCUMENTS

| | | | | |
|---|---|---|---|---|
| 8,132,861 | B2* | 3/2012 | Cone | B60N 2/753 |
| | | | | 297/411.32 |
| 8,403,416 | B2* | 3/2013 | Muck | B60N 2/767 |
| | | | | 297/411.32 |
| 9,481,275 | B2* | 11/2016 | Bohlke | B60N 2/767 |
| 9,758,074 | B1* | 9/2017 | Lin | B60N 2/767 |
| 10,604,047 | B2* | 3/2020 | Tutelea | B60N 2/753 |
| 2018/0056830 | A1* | 3/2018 | Cripe | B60N 2/767 |
| 2019/0001852 | A1 | 1/2019 | Tutelea et al. | |
| 2019/0389351 | A1* | 12/2019 | Boddenberg | B60N 2/938 |

* cited by examiner

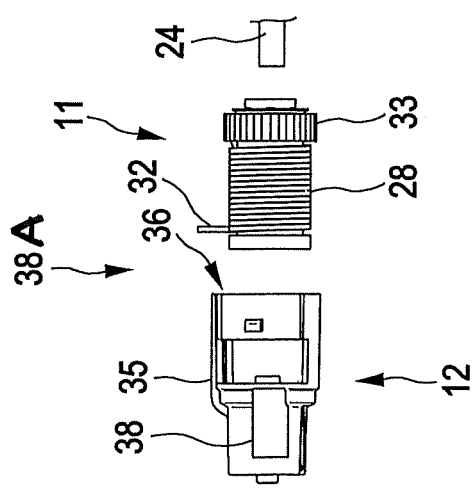
Fig. 6
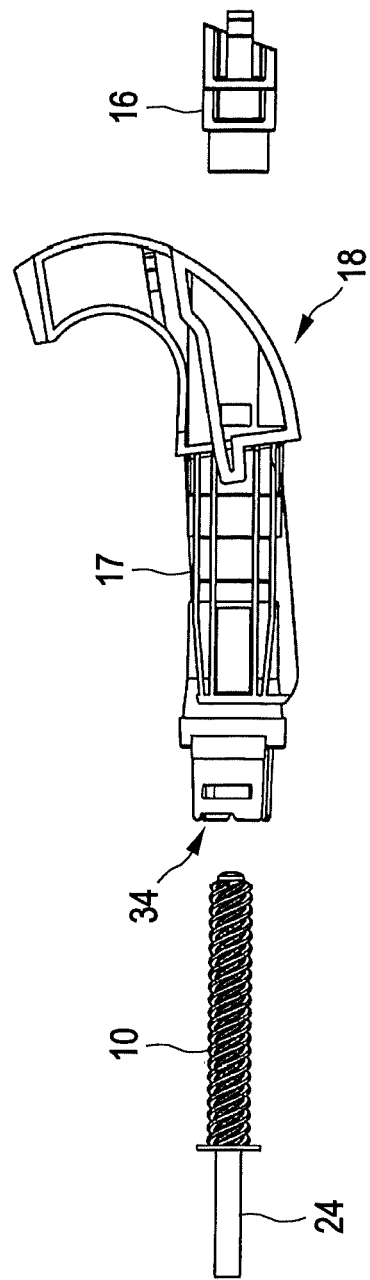
Fig. 7
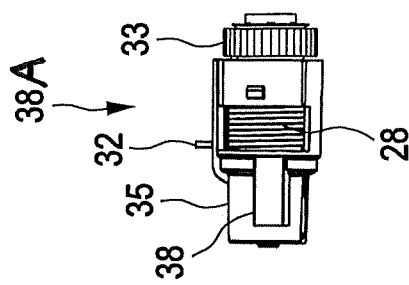

ARMREST ARRANGEMENT FOR A MOTOR VEHICLE SEAT

CROSS-REFERENCE TO RELATED APPLICATIONS

This claims priority from German Application No. 10 2018 210 338.0, filed Jun. 25, 2018, the disclosure of which is hereby incorporated by reference in its entirety into this application.

TECHNICAL FIELD

The invention relates to an armrest arrangement for a motor vehicle seat, having a positionally fixed carrier structure, an armrest structure which can be shifted pivotably about a pivot axis relative to the carrier structure, an inclination adjustment device which is assigned to the armrest structure and, in a functional position of the armrest structure, permits an adjustment of the inclination of the armrest structure relative to the carrier structure, and which has an adjustment element supported on the carrier structure in the functional position, a drive device operatively connected to the adjustment element and a blocking device operatively connected to the adjustment element, wherein, in a release state of the inclination adjustment device, the drive device brings about a driven adjustment movement of the adjustment element along an adjustment axis relative to the armrest structure, and wherein, in a blocking state of the inclination adjustment device, the blocking device brings about blocking of the adjustment element along the adjustment axis.

BACKGROUND

Such an armrest arrangement is known from DE 10 2016 220 501 A1. The known armrest arrangement has a positionally fixed carrier structure and an armrest structure in the form of an armrest body which can be shifted pivotably about a pivot axis relative to the carrier structure. In addition, the known armrest arrangement has an inclination adjustment device which is assigned to the armrest structure. The inclination adjustment device serves for adjusting the inclination of the armrest structure relative to the carrier structure in the functional position. For this purpose, the inclination adjustment device has an adjustment element supported on the carrier structure in the functional position, a drive device operatively connected to the adjustment element and a blocking device operatively connected to the adjustment element. In a release state of the inclination adjustment device, the drive device drives the adjustment element along an adjustment axis relative to the armrest structure. In a blocking state of the inclination adjustment device, the blocking device blocks the adjustability of the adjustment element along the adjustment axis.

SUMMARY

It is an object of the invention to provide an armrest arrangement of the type mentioned at the beginning which has improved properties in relation to the prior art and in particular permits improved locking of an undertaken adjustment of the inclination of the armrest structure.

This object is achieved in that, in the blocking state, the drive device is operatively connected to the blocking device in a force- and/or torque-transmitting manner such that the drive device reinforces a blocking action of the blocking device. The solution according to the invention can therefore achieve improved locking of an undertaken adjustment of the inclination of the armrest structure. This can be achieved since the blocking of the adjustment element—and therefore the locking of the armrest structure—is not merely brought about by means of the blocking device but is additionally reinforced by means of the drive device. For this purpose, in the blocking state, the drive device is operatively connected to the blocking device in a force- and/or torque-transmitting manner. In the blocking state, a force and/or a moment of the drive device acts on the blocking device and therefore reinforces the blocking action of same. By contrast, in the release state, the drive device acts on the adjustment element in order to shift the latter along the adjustment axis. The drive device therefore has a particularly advantageous multiple function to the extent that the drive device serves firstly for driving the adjustment element for the driven adjustment of the inclination of the armrest structure and secondly for reinforcing the blocking of the adjustment element for locking the armrest structure. This makes it possible in particular to achieve a weaker dimensioning of the blocking device in relation to the prior art since the drive device reinforces the blocking action of same.

Consequently, in particular a compact construction and cost-effective manufacturing can be achieved. The adjustment movement is preferably a linear movement along the adjustment axis, which does not rule out the adjustment element also rotating about the adjustment axis during the adjustment movement. The adjustment element can be designed in particular in the form of a threaded spindle or a rack. For interaction with the adjustment element, the armrest structure can be assigned a complementary thread or a complementary toothing or the like. The blocking device is preferably configured in such a manner that, in the blocking state, a form-fitting and/or force-fitting blocking of the adjustment element along the adjustment axis is brought about. For this purpose, in particular a blocking force and/or a blocking moment can be brought about on the adjustment element. The blocking force and/or the blocking moment of the blocking device is reinforced by means of the drive device. The inclination adjustment device can preferably be transferred between the release state and the blocking state by means of manual actuation. The adjustment axis and the pivot axis are preferably oriented perpendicularly to each other.

The solution according to the invention is suitable in a particularly advantageous manner for a driver's seat and/or front passenger's seat of a passenger vehicle. Irrespective thereof, the solution according to the invention can also be used for a motor vehicle seat arranged in the rear region of a passenger vehicle or for a corresponding rear seat bench. However, the armrest arrangement according to the invention can also be used for equipping other motor vehicles and therefore is not limited to passenger vehicles.

In a refinement of the invention, an actuating element which is operatively connected to the blocking device and to the drive device is provided, wherein, by means of actuation of the actuating element, the operative connection between the drive device and the blocking device can be cancelled and the blocking action of the blocking device can be cancelled. Accordingly, the actuating element serves for transferring the inclination adjustment device between the release state and the blocking state. The actuating element here not only acts on the blocking device but additionally on the operative connection formed—in the blocking state—between the drive device and the blocking device. The actuating element is preferably configured and/or arranged in such a manner that, by means of actuation thereof, first of all the operative connection between the drive device and the blocking device can be cancelled and, when the actuation is continued, the blocking action of the blocking device can be cancelled. This applies to an actuation of the actuating element starting from the blocking state of the inclination adjustment device. Starting from the release state of the inclination adjustment device, the operative connection between the drive device and the blocking device can be produced, and subsequent thereto, the blocking action of the blocking device can be produced by means of a—kinematically reversed or renewed—actuation of the actuating element. The actuating element is operatively connected preferably mechanically to the blocking device and the drive device. The actuating element is preferably configured for manual actuation and preferably has a lever mechanism for reinforcing a manual actuating force.

In a further refinement of the invention, a tolerance compensation element which is assigned to the blocking device is provided, by means of which tolerance compensation element a positional tolerance of the blocking device relative to the adjustment axis can be compensated for. The tolerance compensation element serves for correctly installing the blocking device. The tolerance compensation element here is configured in such a manner that a manufacturing-induced positional tolerance of the blocking device relative to the adjustment axis can be compensated for. In particular an angular position of the blocking device relative to the adjustment axis can be adjusted and/or compensated for by means of the tolerance compensation element.

In a further refinement of the invention, the drive device is designed in the form of a spring motor, and the blocking device is designed in the form of a wrap spring brake, wherein, in the blocking state, the spring motor acts on the wrap spring brake in a force- and/or torque-transmitting manner such that a braking action of the wrap spring brake, said braking action blocking the adjustment element, is reinforced. Spring motors are basically known as such and can also be referred to as mechanical spring drives. The spring motor preferably has a tensionable spring element. The energy which can be stored in the spring element can be used firstly for moving the adjustment element and therefore for shifting the armrest structure about the pivot axis relative to the support structure or for assisting such a shifting of the armrest structure. In addition, in the blocking state, the energy stored in the spring element can be conducted to the wrap spring brake such that the blocking braking action of the wrap spring brake is reinforced. The spring element can be designed in particular in the form of a torsion spring or a spiral spring. Wrap spring brakes are known in principle as such and can also be referred to as wrap spring clutches. In the blocking state, the wrap spring brake blocks the adjustability of the adjustment element in a frictionally locking manner. The frictional lock is reinforced here by means of the force and/or moment action of the spring motor on the wrap spring brake.

In a further refinement of the invention, the spring motor has a torsion spring which brings about a torque acting about the adjustment axis, wherein, in the blocking state, the torque is at least partially transmitted to a wrap spring of the wrap spring brake, and wherein, in the release state, the torque is transmitted to the adjustment element. The wrap spring is preferably designed in the form of a spiral spring. In the blocking state, the torque of the torsion spring brings about coiling up and/or reinforced coiling up of the wrap spring. The braking action of the wrap spring brake is thereby reinforced in the blocking state. In the release state, the wrap spring brake is released and the torque of the torsion spring is transmitted to the adjustment element. The torsion spring here drives the adjustment element along the adjustment axis. In this refinement of the invention, the torsion spring has a multiple function. It serves firstly for driving the adjustment element and secondly for reinforcing the braking action of the wrap spring brake. As a result, the wrap spring can be smaller to an extent corresponding in size to an extent of the reinforcement by means of the torsion spring. This is a particularly advantageous refinement of the invention.

In a further refinement of the invention, the wrap spring brake has an inner sleeve which is connected in a torque-transmitting manner to the spring motor and to the adjustment element, and an outer sleeve which is fixed in the radial direction on an outer circumference of the inner sleeve wherein, in the release state, the inner sleeve and the outer sleeve are connected to each other so as to be slidable in relation to each other in the circumferential direction and, in the blocking state, are connected to each other in a frictionally locking manner in the circumferential direction by means of the wrap spring. The inner sleeve and the outer sleeve are preferably oriented coaxially with respect to each other. The inner sleeve and the outer sleeve are preferably each oriented coaxially with respect to the adjustment axis. The wrap spring is fixed in sections on its inner circumference to an outer circumference of the outer sleeve and to the outer circumference of the inner sleeve. The outer sleeve is supported nonrotatably relative to the armrest structure and thereby forms a type of fixed bearing of the wrap spring brake. By contrast, the inner sleeve is nonrotatably supported on the outer sleeve in a frictionally locking manner only in the blocking state and is rotatable in a manner sliding relative to the outer sleeve in the release state. The inner sleeve serves here for transmitting torque between the spring motor and the adjustment element. Preferably, the inner sleeve is connected nonrotatably at one end at least indirectly to the torsion spring and nonrotatably at the other end at least indirectly to the adjustment element.

In a further refinement of the invention, the inclination adjustment device has a carrier housing on which the wrap spring brake is nonrotatably supported on the end side, wherein, in the blocking state, the spring motor is supported nonrotatably on the wrap spring brake. In an installation state, the carrier housing is preferably arranged in a recess of the armrest structure and can be shifted pivotably together with the armrest structure about the pivot axis relative to the carrier structure. The adjustment element is preferably guided along the adjustment axis within the carrier housing. If the adjustment element is designed in the form of a threaded spindle, it is advantageous if a complementary threaded nut is arranged in or on the carrier housing. The carrier housing is preferably manufactured in the form of an injection-moulded plastics component. The effect achieved by this refinement of the invention is a modular construction of the inclination adjustment device. This is particularly advantageous in particular in respect of simplified installation.

In a further refinement of the invention, the wrap spring brake is supported nonrotatably—with respect to the adjustment axis—on the carrier housing in a form-fitting manner by means of a plug-in toothing, wherein the plug-in toothing permits angular positional tolerance compensation of the wrap spring brake, in particular of the wrap spring, relative to the adjustment axis. Particularly precise compensation for the angular positional tolerance can be achieved if the plug-in toothing is designed in the form of a fine toothing.

The wrap spring brake can be plugged axially onto the carrier housing in a simple manner by means of the plug-in toothing. Particularly simple mountability of the wrap spring brake is thereby achieved. In addition, the plug-in toothing permits installation of the wrap spring brake in different angular positions relative to the adjustment axis and/or to the remaining components of the inclination adjustment device. Manufacturing-induced tolerances of the wrap spring brake, in particular of the wrap spring, can thereby be compensated for. If the wrap spring brake has an inner sleeve and an outer sleeve, it is advantageous if the plug-in toothing is formed at least in sections on the outer sleeve.

In a further refinement of the invention, a housing which is assigned to the spring motor and the wrap spring brake is provided, said housing having a cup-like housing recess in which the torsion spring and the wrap spring are each arranged at least in sections, preferably coaxially with respect to each other. The housing here serves in particular for supporting the torsion spring. If an actuating element is provided for transferring the inclination adjustment device between the blocking state and the release state, the actuating element can be operatively connected to the housing. For this purpose, the housing can have in particular an actuating cam. For the shifting between the release state and the blocking state, the housing in particular can be rotatable to a limited extent relative to the adjustment axis. The wrap spring is preferably covered on an outer circumference at least in sections by the housing.

In a further refinement of the invention, in the blocking state, the torsion spring is supported on the wrap spring in a torque-transmitting manner by means of the housing. The housing ensures the force- and/or torque-transmitting operative connection here in the blocking state. For this purpose, the housing can have a supporting portion on which a complementary supporting portion of the wrap spring is supported in the blocking state. The supporting portion can be in particular a longitudinal slot and the complementary supporting portion can be in particular a spring end.

BRIEF DESCRIPTION OF THE DRAWINGS

Further advantages and features of the invention emerge from the claims and from the description below of a preferred exemplary embodiment of the invention, which exemplary embodiment is illustrated with reference to the drawings.

FIG. 6 shows a partially sectioned exploded illustration in a lateral viewing direction of the inclination adjustment device according to FIGS. 3 to 5 in the region of a blocking device, and FIG. 7 shows a schematic exploded illustration in a lateral viewing direction of the inclination adjustment device according to FIGS. 3 to 6.

DETAILED DESCRIPTION

Figure 1:
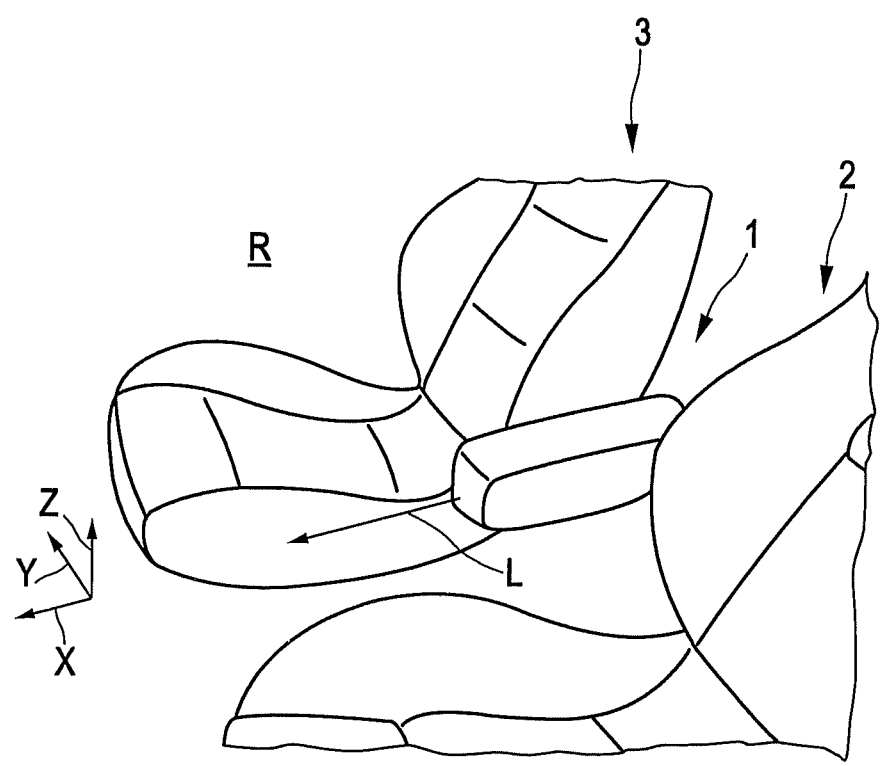
FIG. 1 shows a schematic perspective illustration of an embodiment of an armrest arrangement according to the invention which is arranged in a motor vehicle interior.

According to FIG. 1, an armrest arrangement 1 is arranged in a motor vehicle interior R and is assigned to a motor vehicle seat 2. The armrest arrangement 1 is arranged in the transverse direction Y of the motor vehicle interior R between the motor vehicle seat 2, which is a driver's seat here, and a further motor vehicle seat 3, which is a front passenger's seat here. In an embodiment which is not illustrated specifically, the armrest arrangement 1 can be arranged in a rear region of the motor vehicle interior R and can be assigned to a rear seat bench of the motor vehicle.

Figure 2:
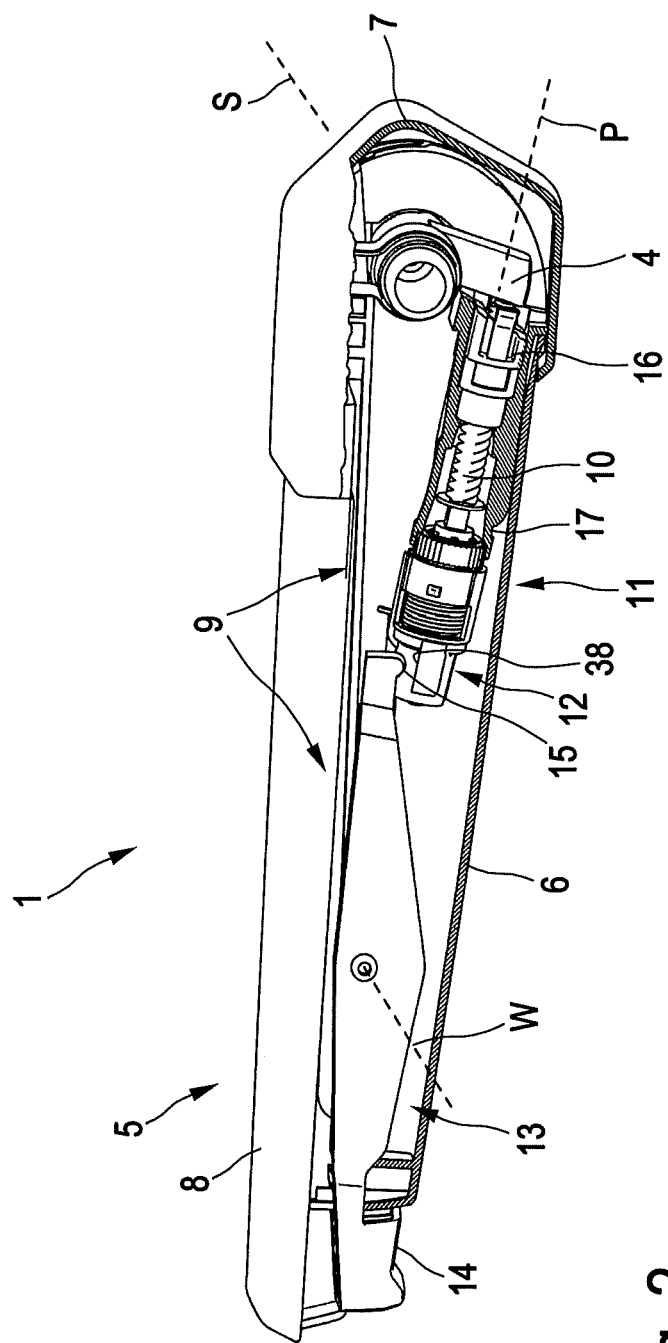
FIG. 2 shows a schematic, partially cut-open perspective illustration of the armrest arrangement according to FIG. 1 in a functional position.
Figure 3:
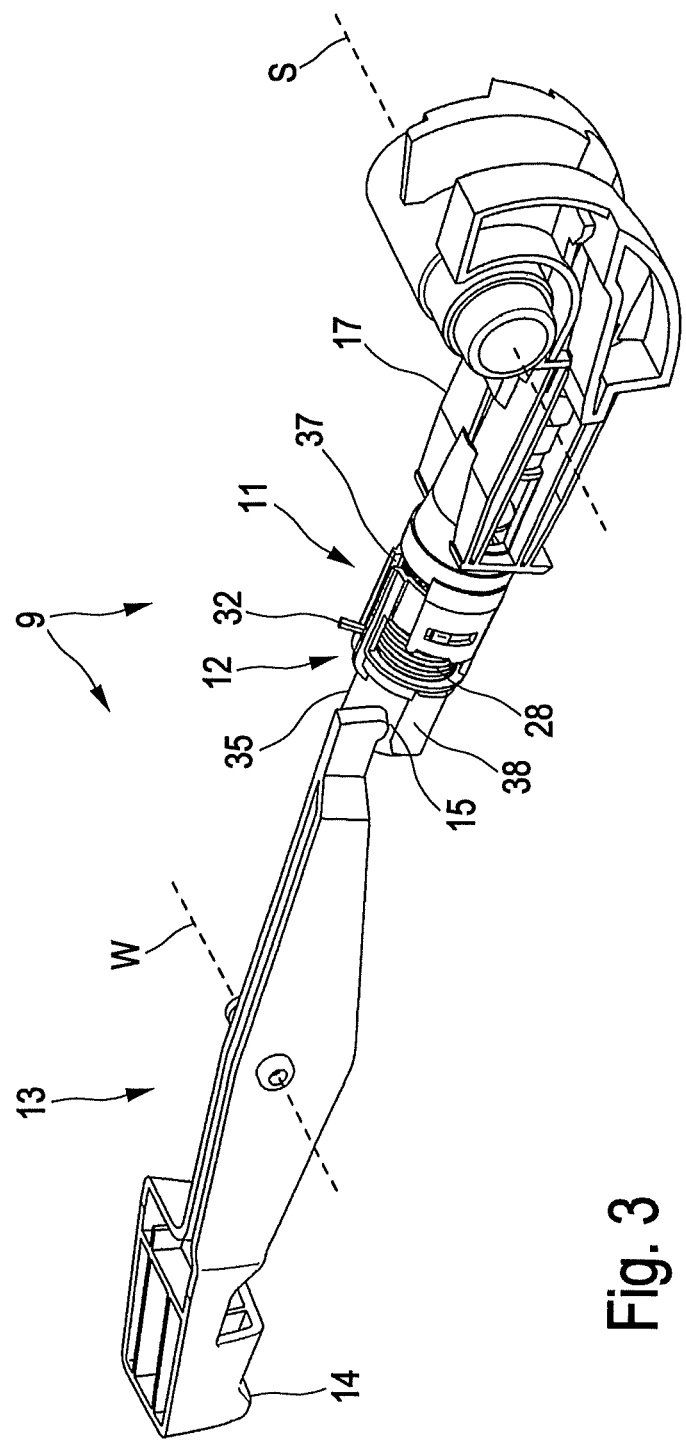
FIG. 3 shows a schematic perspective illustration of an inclination adjustment device of the armrest arrangement according to FIGS. 1 and 2 having an actuating element and a carrier housing.
Figure 4:
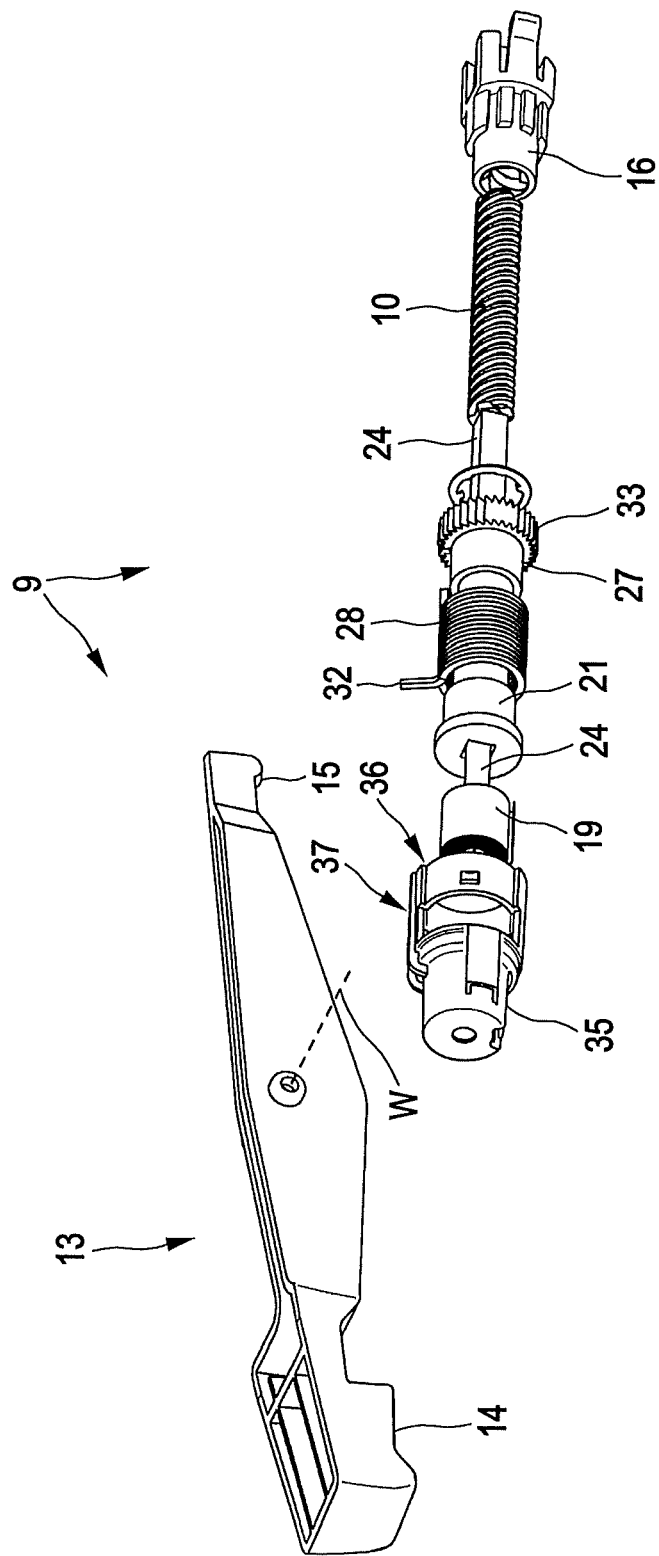
FIG. 4 shows a schematic perspective exploded illustration of the inclination adjustment device according to FIG. 3 with the carrier housing being graphically blanked out.

As is apparent in particular with reference to FIG. 2, the armrest arrangement 1 has a carrier structure 4 which, in the mounted state, is arranged in a positionally fixed manner in the motor vehicle interior R in a way which is known in principle. The armrest arrangement 1 furthermore has an armrest structure 5 which can be shifted pivotably relative to the carrier structure 4 about a pivot axis S. The armrest structure can be shifted pivotably here between a functional position and a non-use position. In the functional position, a longitudinal axis L of the armrest structure 5 is oriented substantially parallel to a longitudinal direction X (FIG. 1) of the motor vehicle interior R and to this extent substantially horizontally. In the non-use position, which is not illustrated specifically graphically, the longitudinal axis L of the armrest structure 5 is oriented substantially parallel to a vertical direction Z (FIG. 1) of the motor vehicle interior R and to this extent substantially vertically. The armrest structure 5 has a Plurality of shell-like trim components 6, 7, 8. The trim arrangement 6, 7, 8 formed from the latter can be covered at least in sections by a lining which is not visible specifically and can be manufactured, for example, from a textile lining material or leather.

In the functional position which can be seen with reference to FIGS. 1 and 2, the armrest structure 5 serves, for example, for supporting a forearm, which is placed on the lining component 8, of a vehicle occupant on the driver's seat 2 or on the front passenger's seat 3. For ergonomic reasons, in the functional position, the inclination of the armrest structure 5 is adjustable relative to the carrier structure 4—and therefore the inclination of the armrest structure 5 is adjustable relative to the longitudinal direction X. For this purpose, an inclination adjustment device 9 which is assigned to the armrest structure 5 is provided. The inclination adjustment device 9 is apparent in detail in particular with reference to FIGS. 3 to 7.

The inclination adjustment device 9 has an adjustment element 10 supported on the carrier structure 4 in the functional position, a drive device 12 operatively connected to the adjustment element 10 and a blocking device 11 operatively connected to the adjustment element 10. In addition, the inclination adjustment device 9 has an actuating element 13 and can be transferred by means of manual actuation of same between a release state and a blocking state.

In the release state, the drive device 12 brings about a driven adjustment movement of the adjustment element 10 along an adjustment axis P relative to the armrest structure 5. This permits an adjustment of the inclination of the armrest structure 5, said adjustment being driven or assisted by means of the drive device. By contrast, in the blocking state, the blocking device 11 brings about blocking of the adjustment element 10 along the adjustment axis P. This ensures that the armrest structure 5 is locked in the previously adjusted inclination relative to the carrier structure 4.

The drive device 12 here is operatively connected in the blocking state to the blocking device 11 in a force- and/or torque-transmitting manner such that the drive device 12 reinforces a blocking action of the blocking device 11. By this means, in particular improved locking of the armrest structure 5 in a previously adjusted inclination relative to the carrier structure 4 can be achieved. The specific configuration of the inclination adjustment device 9 will be discussed in more detail below.

The actuating element 13 here is designed in the form of a rocker lever. The rocker lever 13 is extended longitudinally in the longitudinal direction L of the armrest arrangement 1 and protrudes on the end side with an actuating portion 14 out of the trim arrangement 6, 7, 8. The rocker lever 13 here is pivotable about a rocker axis W by means of manual actuation of the actuating portion 14 in the vertical direction of the plane of the drawing of FIG. 2. The rocker axis W is oriented parallel to the pivot axis S. The rocker axis W is supported on the armrest structure 5 in a manner not specifically apparent. The rocker lever 13 has a pressure portion 15 on an end region opposite the actuating portion 14 in the longitudinal direction L. When the rocker lever 13 is actuated, the pressure portion 15 acts in a manner still to be described in detail on the blocking device 11 and the drive device 12.

Figure 5:
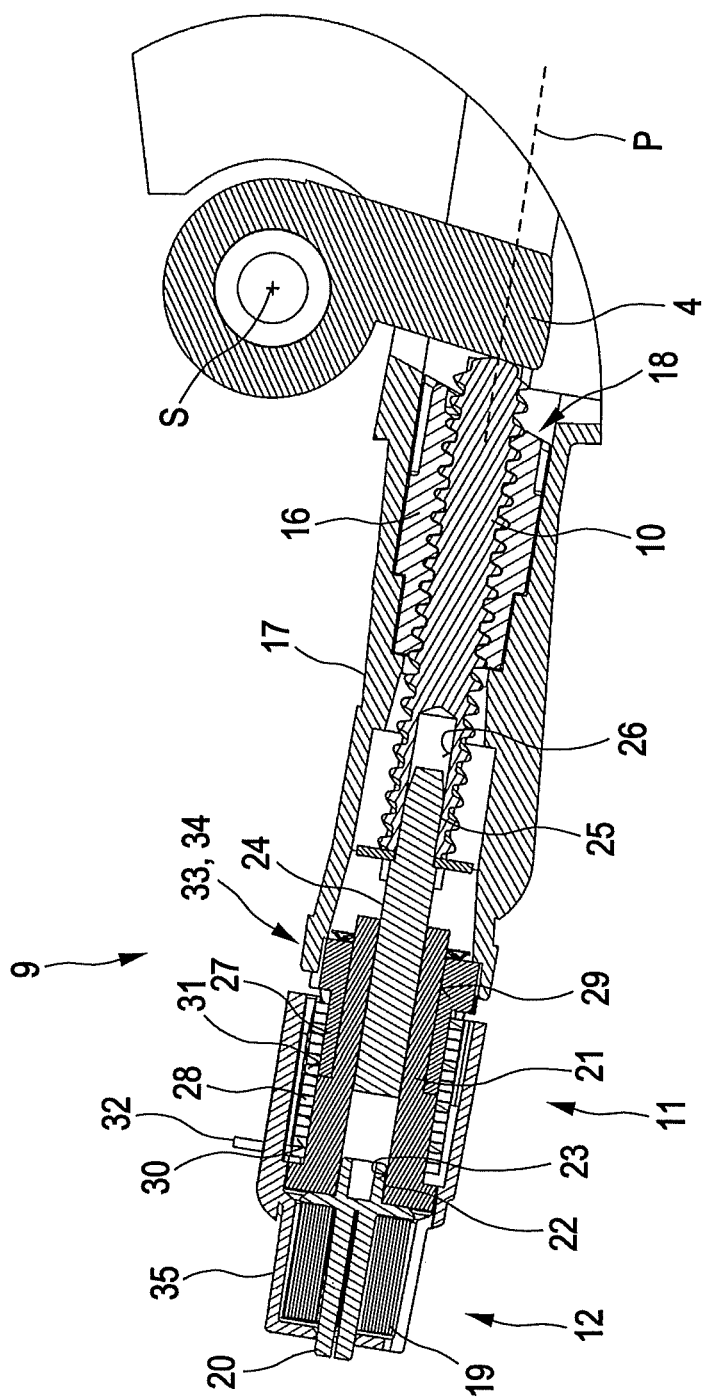
FIG. 5 shows a schematic longitudinal sectional illustration of the inclination adjustment device according to FIGS. 3 and 4 with the actuating element being graphically blanked out.

The adjustment element 10 here is designed in the form of a threaded spindle. The threaded spindle 10 is supported in the functional position on the carrier structure 4 at one end and at the other end is connected in a torque-transmitting manner to the blocking device 11 and the drive device 12 in a way which has still to be described in detail. The threaded spindle 10 interacts with a threaded nut 16 (FIG. 5). The threaded nut 16 is fixed nonrotatably on a carrier housing 17 of the inclination adjustment device 9. For this purpose, on an end region facing the carrier structure 4—at any rate in the functional position—the carrier housing 17 has a receiving recess 18, into which the threaded nut 16 is fitted in a form-fitting manner so as to be non-rotatable about the adjustment axis P. The threaded spindle 10 and the threaded nut 16 interact in a non-self-locking manner. This means that the threaded spindle 10 can be rotated about the adjustment axis P by means of an axial loading along same.

The drive device 12 here is designed in the form of a spring motor. The blocking device 11 here is designed in the form of a wrap spring brake. In the blocking state, the spring motor 12 here acts on the wrap spring brake 11 in a force- and/or torque-transmitting manner such that a blocking action of the wrap spring brake 11, said blocking action blocking the threaded spindle 10 along the adjustment axis P, is reinforced.

The spring motor 12, which can also be referred to as a mechanical spring drive, has a torsion spring 19 which is oriented coaxially with respect to the threaded spindle 10. Furthermore, the spring motor 12 has an output shaft 20. The torsion spring 19 is fixed on its inner circumference on the output shaft 20 in a manner not specifically apparent. The output shaft 20 is joined together with an inner sleeve 21 on the end side in a manner fixed against torque. The inner sleeve is assigned here to the wrap spring brake 11. For the connection fixed in terms of torque between the output shaft 20 and the inner sleeve 21, the former has a form-fitting pin 22 which is plugged into a form-fitting opening 23 of the inner sleeve 21. The form-fitting pin 22 and the form-fitting opening 23 here have a square outer profile and a square inner profile, respectively. The form-fitting opening 23 is configured as a through bore and, on a region facing away from the form-fitting pin 22, nonrotatably accommodates a driver shaft 24. The driver shaft 24 has an outer square profile which interacts in a form-fitting manner in the circumferential direction with the inner square profile of the form-fitting opening 23. On an end region facing away from the inner sleeve 21, the driver shaft 24 is joined together with the threaded spindle 10 nonrotatably in a form-fitting manner. For this purpose, the driver shaft 24 has on the end side a profile portion 25 which is plugged into a complementary profile portion 26 of the threaded spindle 10. In this manner—at any rate in the release state of the inclination adjustment device 9—a torque-transmitting operative connection is produced between the spring motor 12 and the threaded spindle 10.

In addition to said inner sleeve 21, the wrap spring brake 11 has an outer sleeve 27, which is oriented coaxially with respect to said inner sleeve, and a wrap spring 28. The outer sleeve 27 is fixed in the radial direction, i.e. radially with respect to the adjustment axis P, on an outer circumference 29 of the inner sleeve 21. The inner sleeve 21 is set back in the region of the outer circumference 29 in the radial direction relative to a further outer circumference 30. The outer circumference 30 and an outer circumference 31 of the outer sleeve 27 are coordinated in terms of size with each other in such a manner that a transition free of a radial step is provided between the inner sleeve 21 and the outer sleeve 27 in the axial direction. The wrap spring 28 is designed in the form of a spiral spring and is fixed in a manner fixed against torque on the outer circumference 31 of the outer sleeve 27 in a manner not specifically apparent. In the release state, the spiral spring 28 is slidable on its inner circumference in the circumferential direction in relation to the further outer circumference 30 of the inner sleeve 21. By contrast, in the blocking state, the spiral spring 28 is radially contracted in a manner known in principle, and therefore a friction-locking connection is brought about between the inner circumference of the spiral spring 28 and the further outer circumference 30. A frictionally locking connection between the inner sleeve 21 and the outer sleeve 27 is thereby brought about in the blocking state. For the actuation of the wrap spring brake 11, the spiral spring 28 has a spring end 32 which protrudes outwards in the radial direction and is arranged on an end region of the spiral spring 28, which end region faces the spring motor 12.

The wrap spring brake 11 is supported nonrotatably on an end region of the carrier housing 17, said end region facing away from the carrier structure 4. For this purpose, a plug-in toothing 33, 34 is provided. The plug-in toothing 33, 34 has a toothing portion 33 which is formed on a radially outwardly disposed region of the outer sleeve 27. In addition, the plug-in toothing 33, 34 has a complementary toothing portion 34 arranged on the end side of the carrier housing 17. The toothing portion 33 here is an outer toothing. The toothing portion 34 here is an inner toothing. The plug-in toothing 33, 34 is designed here in the form of a fine toothing. The fine toothing 33, 34 firstly permits a form-fitting connection, which is nonrotatable about the adjustment axis P, between the wrap spring brake 11 and the carrier housing 17. In addition, the fine toothing 33, 34 permits tolerance compensation of the angular position since the wrap spring brake 11 can be plugged into the carrier housing 17 in the axial direction in different angular positions relative thereto and can therefore be joined together therewith. The plug-in toothing 33, 34 therefore forms a tolerance compensation element. Simplified correct installation in particular in respect of an angular position of the spring end 32—is made possible by means of the tolerance compensation element 33, 34 in a manner still to be described in detail.

In addition, a housing 35 which is assigned to the spring motor 12 and the wrap spring brake 11 is provided. The housing 35 has a cup-like housing recess 36 in which the torsion spring 19 and the wrap spring 28 are arranged coaxially with respect to each other. The torsion spring 19 is supported on an inner surface of the housing recess 36 in a torque-transmitting manner in a way which is not specifically apparent. The housing engages over the spiral spring 28 in the radial direction spaced apart by a circumferential gap (not denoted specifically). The spring end 32 protrudes here in the radial direction through a longitudinal slot 37 of the housing 35. The longitudinal slot 37 and the spring end 32 interact in a form-fitting manner in the circumferential direction.

As a result of the previously described configuration of the inclination adjustment device 9, the latter has a modular construction. Said modular construction permits in particular particularly simple installation, as will be explained below in particular with reference to FIGS. 6 and 7. For the installation of the inclination adjustment device 9, first of all the threaded nut 16 is plugged into the end-side receiving recess 18 of the carrier housing 17. In order to ensure correct locking of the threaded nut 16 in the receiving recess 18, latching means (not specifically apparent) or the like can be provided. In a state preassembled with the driver shaft 24, the threaded spindle 10 is then introduced on the end side into the carrier housing 17 and screwed to the threaded nut 16. The driver shaft 24 protrudes here on the end side out of the carrier housing. The wrap spring brake 11 and the spring motor 12 are then joined together with the driver shaft 24 and the carrier housing 17, respectively, in a preassembled state. As can be seen with reference to FIGS. 6 and 7, in said preassembled state, the wrap spring brake 11 and the spring motor 12 form a compact functional module 38A. The functional module 38A is plugged onto the carrier housing 17 in the axial direction. The fine toothing 33, 34 firstly serves here for a form-fitting connection between the functional module 38A and the carrier housing 17. Secondly, a manufacturing-induced angular position deviation of the spring end 32 of the wrap spring 28 can be compensated for by means of the fine toothing 33, 34. A correct positioning of the spring end 32 relative to the longitudinal slot 37 of the housing 35 and therefore a correct positioning of the housing 35 relative to the pressure portion 15 of the rocker lever 13 are thereby possible. The inclination adjustment device 9 which is mounted in this manner can be joined together with the other components of the armrest arrangement 1 in a manner which is known in principle.

The manner of operation of the inclination adjustment device 9 during an adjustment of the inclination of the armrest structure 5 will be discussed in more detail below. For this purpose, reference is made first of all to FIG. 2. The inclination adjustment device can be seen in the blocking state with reference to FIG. 2.

In the blocking state, pivoting of the armrest structure 5 anticlockwise about the pivot axis S is prevented as a result of the adjustment element 10 bearing against the supporting structure 4. By contrast, pivoting in the clockwise direction into the upwardly folded non-use position, not illustrated specifically, is readily possible. In the configuration apparent with reference to FIG. 2, an adjustment movement of the threaded spindle 10 along the adjustment axis P is prevented by means of the wrap spring brake 11. This is prevented since the spiral spring 28 is contracted in the radial direction in a way known in principle and in this way brings about a frictionally locking connection between the inner sleeve 21 and the outer sleeve 27. Longitudinal movability of the threaded spindle 10 along the adjustment axis P, which is basically possible because of the non-self-locking interaction between the threaded spindle 10 and the threaded nut 16, is therefore prevented, as a result of which the armrest structure 5—in the event of a downwardly directed loading—is locked in its inclination relative to the carrier structure 4. The blocking action of the wrap spring brake 11 results here from the friction lock between the inner circumference of the spiral spring 28 and the outer circumference 30 of the inner sleeve 21. The spiral spring 28 is pretensioned here in such a manner that, with the spring end 32 not being actuated, said spiral spring already brings about a frictionally locking connection in the circumferential direction. Said blocking braking action of the wrap spring brake 11 here is reinforced by the fact that the torsion spring 19 is operatively connected to the spring end 32 by means of the housing 35. By this means, the torque of the torsion spring 19 is transmitted to the spiral spring 28 via the spring end 32 which is fitted into the longitudinal slot 37. The spiral spring 28 thereby contracts in a reinforced manner in the radial direction. By this means, the frictionally locking connection between the spiral spring 28 and the inner sleeve 21 is reinforced. This leads to a reinforced braking action of the wrap spring brake 11, as a result of which reinforced blocking of the threaded spindle 10 and ultimately an improved locking of the armrest structure 5 in the undertaken inclination adjustment is brought about. The torque of the torsion spring 19 here acts in the blocking state on the spring end 32 in such a manner that the latter is moved into the plane of the drawing of FIG. 5.

Starting from the previously described blocking state, the inclination adjustment device 9 can be transferred into the release state by means of manual actuation of the rocker lever 13. For this purpose, the actuating portion 14 is shifted upwards manually—with respect to the plane of the drawing of FIG. 2. The rocker lever 13 then moves in the clockwise direction about the rocker axis W, whereupon the pressure portion 15 is moved downwards and comes to bear against an actuating cam 38 formed on the housing 35. By means of the previously described actuation of the rocker lever 13, firstly here the operative connection between the spring motor 12 and the wrap spring brake 11 can be cancelled and, in addition, the braking action of the wrap spring brake 11 as such can be cancelled. Then, on account of the downwards movement of the pressure portion 15, the actuating cam 38 is subjected to a force in such a manner that the housing 35 is rotated in the clockwise direction about the adjustment axis P. By this means, firstly, the torque support of the torsion spring 19 on the spring end 32 by means of the housing 35 is cancelled. Secondly, the spring end 32 is subjected to a torque in the clockwise direction by means of the housing 35, as a result of which the spiral spring 28 is widened in its radial diameter. As a result, the friction lock between the inner circumference of the spiral spring 28 and the outer circumference 30 of the inner sleeve 21 and therefore the brake action of the wrap spring brake 11 are cancelled. The torque of the torsion spring 19 is now transmitted via the output shaft 20 to the inner sleeve 21, from the latter to the driver shaft 24 and therefore to the threaded spindle 10, as a result of which the latter is moved in the clockwise direction about the adjustment axis P and along the adjustment axis P in the direction of the carrier structure 4 out of the carrier housing 17. By means of this adjustment movement, the armrest structure 5 is adjusted upwards in its inclination relative to the carrier structure. This takes place until the manual actuation of the rocker lever 13 is interrupted, whereupon the inclination adjustment device 9 is transferred in turn into the above-described blocking state.

The invention claimed is:

1. An armrest arrangement for a motor vehicle seat, comprising:
   a positionally fixed carrier structure;
   an armrest structure pivotably shiftable about a pivot axis relative to the carrier structure; and
   an inclination adjustment device assigned to the armrest structure and, in a functional supporting position of the armrest structure, permitting an adjustment of an inclination of the armrest structure relative to the carrier structure, the inclination adjustment device comprising an adjustment element supported on the carrier structure in the functional supporting position of the armrest structure, a drive device operatively connected to the adjustment element and a blocking device operatively connected to the adjustment element;
   wherein, in a release state of the inclination adjustment device, the drive device drives the adjustment element and causes an adjustment movement of the adjustment element along an adjustment axis relative to the armrest structure;
   wherein, in a blocking state of the inclination adjustment device, the blocking device blocks the adjustment element to prevent movement of the adjustment element along the adjustment axis; and
   wherein, in the blocking state, the drive device is operatively connected to the blocking device in a force- and/or torque-transmitting manner such that the drive device reinforces a blocking action of the blocking device.

2. The armrest arrangement according to claim 1, further including an actuating element operatively connected to the blocking device and to the drive device, and actuation of the actuating element cancels the operative connection between the drive device and the blocking device and cancels the blocking action of the blocking device.

3. The armrest arrangement according to claim 1, further including a tolerance compensation element which is assigned to the blocking device, the tolerance compensation element compensating for a positional tolerance of the blocking device relative to the adjustment axis.

4. The armrest arrangement according to claim 1, wherein the drive device comprises a spring motor and the blocking device comprises a wrap spring brake, wherein, in the blocking state, the spring motor acts on the wrap spring brake in a force- and/or torque-transmitting manner such that a braking action of the wrap spring brake, said braking action blocking the adjustment element, is reinforced.

5. The armrest arrangement according to claim 4, wherein the spring motor comprises a torsion spring which brings about a torque acting about the adjustment axis, wherein, in the blocking state, the torque is at least partially transmitted to a wrap spring of the wrap spring brake and, in the release state, the torque is transmitted to the adjustment element.

6. The armrest arrangement according to claim 5, wherein the wrap spring brake has an inner sleeve which is connected in a torque-transmitting manner to the spring motor and to the adjustment element, and an outer sleeve which is fixed in the radial direction on an outer circumference of the inner sleeve, wherein, in the release state, the inner sleeve and the outer sleeve are connected to each other so as to be slidable in relation to each other in a circumferential direction and, in the blocking state, the inner sleeve and the outer sleeve are connected to each other in a frictionally locking manner in the circumferential direction by the wrap spring.

7. The armrest arrangement according to claim 5, further including a housing assigned to the spring motor and the wrap spring brake, said housing having a housing recess in which the torsion spring and the wrap spring are each arranged coaxially with respect to each other.

8. The armrest arrangement according to claim 7, wherein, in the blocking state, the torsion spring is supported on the wrap spring in a torque-transmitting manner by the housing.

9. The armrest arrangement according to claim 4, wherein the inclination adjustment device has a carrier housing, the wrap spring brake being nonrotatably supported on one end of the carrier housing, wherein, in the blocking state, the spring motor is supported nonrotatably on the wrap spring brake.

10. The armrest arrangement according to claim 9, wherein the wrap spring brake is supported nonrotatably, with respect to the adjustment axis, on the carrier housing in a form-fitting manner by a plug-in toothing, wherein the plug-in toothing permits angular positional tolerance compensation of the wrap spring brake relative to the adjustment axis.

11. The armrest arrangement according to claim 1, wherein the carrier structure defines the pivot axis and the armrest structure is mounted for pivotable movement relative to the carrier structure about the pivot axis.

12. The armrest arrangement according to claim 1, wherein the armrest structure in the functional supporting position is oriented substantially horizontally so as to support an arm of a user.

13. The armrest arrangement according to claim 1 wherein the adjustment element when driven by the drive device moves linearly along the adjustment axis relative to the carrier structure and the armrest structure.

14. An armrest arrangement for a motor vehicle seat, said armrest arrangement comprising:
   a carrier structure defining an axis;
   an armrest structure defining thereon a surface configured for supporting an arm of a user, said armrest structure being mounted for pivotable movement relative to said carrier structure about the axis thereof, said armrest structure being positionable in a functional supporting position in which said armrest structure is oriented substantially horizontally to support the arm of the user; and
   an inclination adjustment arrangement configured to permit an adjustment of an inclination of said armrest structure relative to said carrier structure when said armrest structure is oriented in the functional supporting position, said inclination adjustment arrangement comprising an adjustment element supported on said carrier structure in the functional supporting position, a drive device operatively connected to said adjustment element and a blocking device operatively connected to said adjustment element, said inclination adjustment arrangement having a release state and a blocking state, said drive device in the release state driving said adjustment element to cause movement thereof along an adjustment axis relative to said carrier structure, and said blocking device in the blocking state exerting a blocking action on said adjustment element to prevent movement thereof along the adjustment axis, said drive device in the blocking state being operatively connected to said blocking device in a force-transmitting manner to act on said blocking device to reinforce the blocking action thereof on said adjustment element.

15. The armrest arrangement according to claim 14, wherein said carrier structure is positionally fixed and non-movable relative to said armrest structure and said adjustment element, said adjustment element in the release state of said inclination adjustment arrangement being movable by said drive device along the adjustment axis relative to armrest structure and said carrier structure.

16. The armrest arrangement according to claim 15, wherein said blocking device comprises a brake disposed to exert a braking action on said adjustment element in the blocking state, and in the blocking state said drive device acts on said brake in a force-transmitting manner to reinforce the braking action of said brake on said adjustment element.

17. The armrest arrangement according to claim 16, wherein said brake comprises a spring brake and said drive device comprises a torsion spring disposed to exert a torque about the adjustment axis, and in the blocking state the torque is partially transmitted to said spring brake and in the release state the torque is transmitted to said adjustment element to drive said adjustment element and move said adjustment element along the adjustment axis.

18. The armrest arrangement according to claim 14, wherein said adjustment element is movable by said drive device in a linear manner along the adjustment axis, and the adjustment axis is oriented transversely relative to the axis of said carrier structure.

19. The armrest arrangement according to claim 18, wherein said adjustment element is mounted on said armrest structure for rotatable movement about the adjustment axis.

* * * * *